(12) United States Patent
Matsumura et al.

(10) Patent No.: US 10,775,153 B2
(45) Date of Patent: *Sep. 15, 2020

(54) INNER CIRCUMFERENTIAL LENGTH MEASURING DEVICE FOR CIRCULAR MEMBER

(71) Applicant: The Yokohama Rubber Co., LTD., Minato-ku, Tokyo (JP)

(72) Inventors: Kensuke Matsumura, Shinshiro (JP); Yuichi Sugiyama, Shinshiro (JP)

(73) Assignee: The Yokohama Rubber Co., LTD. (JP)

( * ) Notice: Subject to any disclaimer, the term of this patent is extended or adjusted under 35 U.S.C. 154(b) by 58 days.

This patent is subject to a terminal disclaimer.

(21) Appl. No.: 16/085,558

(22) PCT Filed: Feb. 16, 2017

(86) PCT No.: PCT/JP2017/005616
§ 371 (c)(1),
(2) Date: Sep. 14, 2018

(87) PCT Pub. No.: WO2017/159194
PCT Pub. Date: Sep. 21, 2017

(65) Prior Publication Data
US 2019/0154432 A1 May 23, 2019

(30) Foreign Application Priority Data

Mar. 16, 2016 (JP) .................................. 2016-052618

(51) Int. Cl.
*G01B 11/04* (2006.01)
*G01B 21/02* (2006.01)
(Continued)

(52) U.S. Cl.
CPC ............ *G01B 11/043* (2013.01); *G01B 11/02* (2013.01); *G01B 11/026* (2013.01); *G01B 21/02* (2013.01); *G01B 21/06* (2013.01)

(58) Field of Classification Search
CPC ..... G01B 11/02; G01B 11/026; G01B 11/043; G01B 11/12; G01B 11/24; G01B 11/255;
(Continued)

(56) References Cited

U.S. PATENT DOCUMENTS

| 6,289,600 B1 | 9/2001 | Watts |
|---|---|---|
| 2013/0253871 A1 | 9/2013 | Gray |

(Continued)

FOREIGN PATENT DOCUMENTS

| CN | 101020536 | 8/2007 |
|---|---|---|
| CN | 102672224 | 9/2012 |

(Continued)

OTHER PUBLICATIONS

International Search Report for Application No. PCT/JP2017/005616 dated May 9, 2017, 4 pages, Japan.

*Primary Examiner* — Michael A Lyons
(74) *Attorney, Agent, or Firm* — Thorpe North & Western

(57) ABSTRACT

Provided is an inner circumferential length measuring device for a circular member, the device having a support with two projection portions projecting from a surface of the support and configured to engage an inner circumferential surface of the circular member. A two-dimensional sensor is disposed facing the inner circumferential surface of the circular member at a predetermined measurement position and is rotatable about a rotation shaft at a predetermined position inward of the circular member, the two-dimensional sensor being configured to measure a separation distance from the two-dimensional sensor to the inner circumferential surface around an entire circumference of the circular member. A calculation unit calculates an inner circumferential length of the circular member using the separation distance and a distance from the rotation shaft to the two-dimensional sensor.

6 Claims, 6 Drawing Sheets

(51) Int. Cl.
   *G01B 11/02*   (2006.01)
   *G01B 21/06*   (2006.01)

(58) Field of Classification Search
   CPC ........ G01B 21/02; G01B 21/04; G01B 21/06;
   G01B 21/14; G01B 21/20
   See application file for complete search history.

(56) References Cited

U.S. PATENT DOCUMENTS

| | | |
|---|---|---|
| 2015/0241206 A1 | 8/2015 | Kasai et al. |
| 2016/0161250 A1 | 6/2016 | Nakamura |
| 2019/0154431 A1* | 5/2019 | Matsumura ............ G01B 21/02 |
| 2019/0154433 A1* | 5/2019 | Matsumura ............ G01B 11/12 |

FOREIGN PATENT DOCUMENTS

| | | |
|---|---|---|
| JP | H01-195309 | 8/1989 |
| JP | H03-007482 | 1/1991 |
| JP | H06-001128 | 1/1994 |
| JP | 2005-140726 | 6/2005 |
| JP | 2010-048731 | 3/2010 |
| JP | 2012-150013 | 8/2012 |
| KR | 10-2011-0076437 | 7/2011 |
| WO | WO 2013/142570 | 9/2013 |
| WO | WO 2014/054666 | 4/2014 |
| WO | WO 2015/008820 | 1/2015 |

\* cited by examiner

INNER CIRCUMFERENTIAL LENGTH MEASURING DEVICE FOR CIRCULAR MEMBER

TECHNICAL FIELD

The present technology relates to an inner circumferential length measuring device for a circular member and particularly relates to an inner circumferential length measuring device for a circular member capable of accurately measuring an inner circumferential length without applying an unnecessary load of the circular member.

BACKGROUND ART

Various circular members (circular members and annular members) such as bead members and cylindrical rubber members are used in the manufacture of a rubber product such as a tire. The inner circumferential length of such a circular member has a preset setting value designated by the design. However, due to a manufacturing error or the like, the actual inner circumferential length of the circular member may differ from the preset setting value. If this deviation is within a tolerance range, there is no problem. However, if outside of this tolerance range, the rubber product manufactured using the circular member may have quality problems. Thus, the inner circumferential length of the circular member needs to be measured and determined.

In the related art, various measuring devices for the inner circumferential length of an annular bead member have been proposed (for example, see Japan Unexamined Patent Publication Nos. 2012-150013 and 06-1128). In the device described in Japan Unexamined Patent Publication No. 2012-150013, a cylindrical measurement support including two semicylindrical sections is disposed on the inner side of a bead member. In measuring the inner circumferential length of the bead member, the sections are moved away from each other and the outer circumferential surfaces of the sections are put in close contact with the inner circumferential surface of the bead member. The separation distance between the sections at this time and the circumferential length around the outer circumferential surfaces of the sections are used to measure the inner circumferential length of the bead member. However, because the outer circumferential surfaces of the sections are put in close contact with the inner circumferential surface of the bead member, force pushing to expand the diameter of the bead member is applied. This may cause deformation. Thus, this is not advantageous in improving the accuracy in measuring the inner circumferential length.

In the device described in Japan Unexamined Patent Publication No. 06-1128, a roller is directly brought into contact and pushed against an inner circumferential surface of a bead member. The roller is rolled along the inner circumferential surface of the bead member for one rotation in the circumferential direction. The number of times the roller rotated is used to measure the inner circumferential length of the bead member. However, because the roller directly comes into contact and pushes against the inner circumferential surface of the bead member, deformation may occur. Thus, this is not advantageous in improving the accuracy in measuring the inner circumferential length.

SUMMARY

The present technology provides an inner circumferential length measuring device for a circular member capable of accurately measuring an inner circumferential length without applying an unnecessary load of the circular member.

An inner circumferential length measuring device for a circular member according to an embodiment of the present technology includes:

a support on which the circular member is placed;

a two-dimensional sensor disposed allowing for movement relative to the support;

a rotation driving mechanism configured to rotate the two-dimensional sensor; and a calculation unit configured to receive measurement data from the two-dimensional sensor;

the support being raisable from a horizontal state to an upright state;

the support including a plurality of projection portions on a surface, the plurality of projection portions being spaced from one another and projecting from the surface;

by an inner circumferential surface of the circular member being engaged with two of the plurality of projection portions of the support in an upright state, the circular member being able to be placed on the support;

by the support on which the circular member is placed being put in a horizontal state, the circular member being able to be placed flat on the support in an unrestrained state;

by the two-dimensional sensor disposed facing the inner circumferential surface of the circular member at a predetermined measurement position being rotated about a predetermined position inward of the circular member via the rotation driving mechanism, a separation distance from the two-dimensional sensor to the inner circumferential surface being measured by the two-dimensional sensor in a non-contact state with the circular member in a range of an entire circumference of the circular member; and the calculation unit calculating an inner circumferential length of the circular member based on the separation distance measured and a distance from the predetermined position to the two-dimensional sensor in a plan view.

According to an embodiment of the present technology, the inner circumferential length of the circular member placed flat in an unrestrained state on the support is measured using the two-dimensional sensor without the two-dimensional sensor coming into contact with the circular member. Thus, an unnecessary load is not applied to the circular member, and thus deformation thought obligatory does not occur. Additionally, by engaging the inner circumferential surface of the circular member with two of the plurality of projection portions projecting from the surface of the support in an upright state, placing the circular member on the support, and lowering the support to a horizontal state, the circular member can be placed flat in an unrestrained state on the support. Accordingly, even a large-sized circular member can be easily and accurately placed flat on the support at a predetermined position, and unnecessary external forces on the circular member during placement are minimized or removed allowing deformation to be reduced. This is advantageous in measuring the inner circumferential length of the circular member with high accuracy.

DETAILED DESCRIPTION

Figure 1:
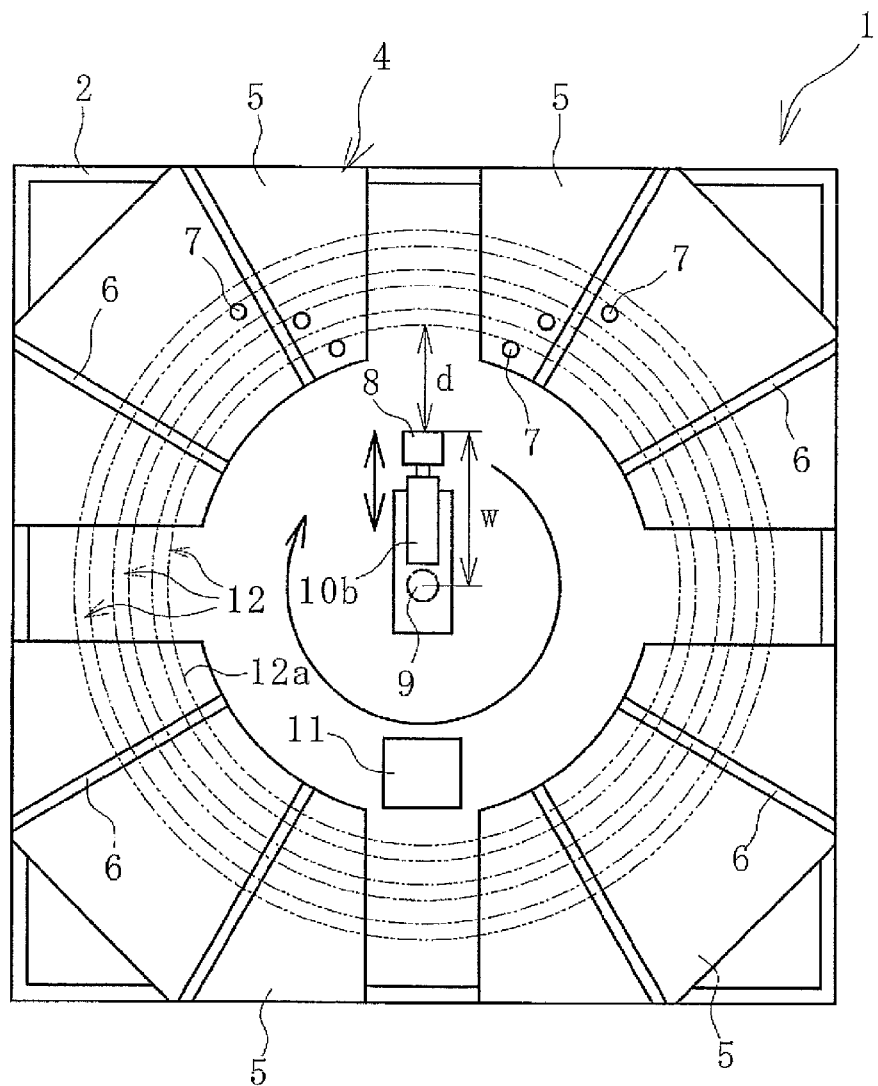
FIG. 1 is an explanatory diagram illustrating an inner circumferential length measuring device of an embodiment of the present technology in a plan view.

An inner circumferential length measuring device for a circular member according to embodiments of the present technology will be described in detail below with reference to embodiments illustrated in the drawings.

Figure 2:
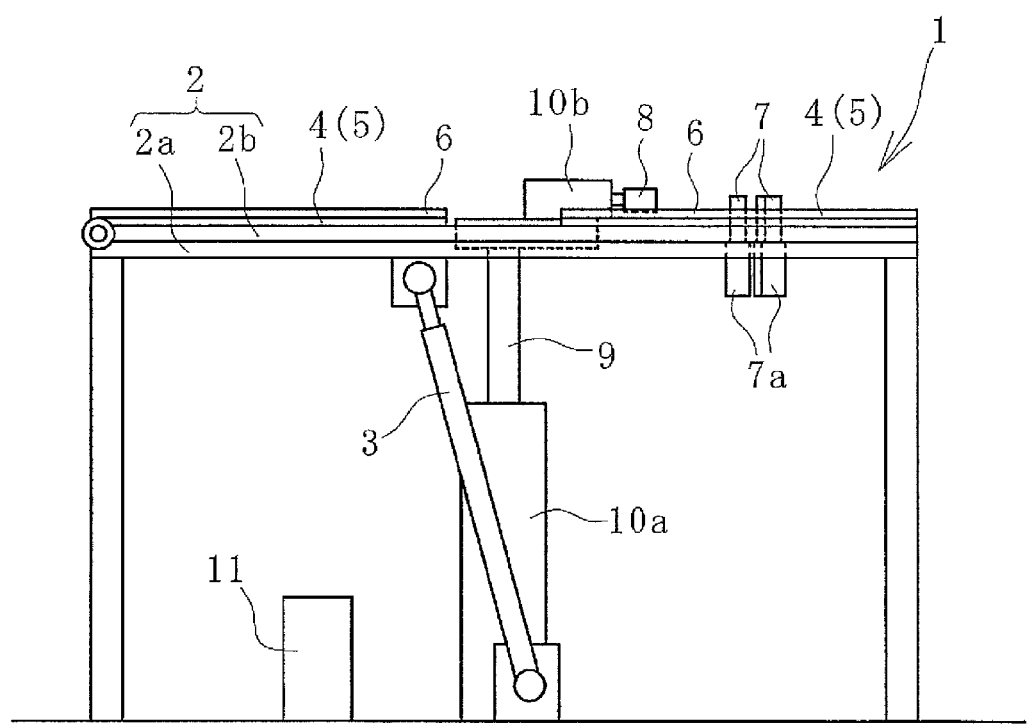
FIG. 2 is an explanatory diagram illustrating the measuring device of FIG. 1 in a side view.

Using an inner circumferential length measuring device for a circular member of an embodiment of the present technology illustrated in FIGS. 1 and 2, the inner circumferential length can be measured for various circular members 12 (circular members and annular members) such as bead members and cylindrical rubber members used in a rubber product such as a tire. In FIG. 1, the circular member 12 is indicated by a two-dot chain line. When measuring, a single circular member 12 is set in the measuring device 1.

The measuring device 1 includes a support 4 on which the circular member 12 to be measured is placed, a two-dimensional sensor 8 disposed allowing for movement independent of the support 4, a rotation driving mechanism 10a configured to rotate the two-dimensional sensor 8, and a calculation unit 11 configured to receive measurement data from the two-dimensional sensor 8. As the calculation unit 11, various kinds of computers can be used.

The circular member 12 is placed flat in an unrestrained state on the horizontally orientated support 4. "Unrestrained state" is a state in which no external forces other than those relating gravitational forces (empty weight) are acting upon the circular member 12. In this embodiment, the support 4 includes a plurality of sections 5 divided in the circumferential direction. Each section 5 includes on an upper surface a protrusion-like support portion 6 that projects upward. The circular member 12 is placed flat in an unrestrained state on the protrusion-like support portions 6. The protrusion-like support portion 6 extends in a rod-like manner in the radial direction of the circular member 12.

The support 4 may be formed as an undivided single plate body instead of including the sections 5. The number of protrusion-like support portions 6 is at least three, with a suitable number ranging from three to twelve, for example.

Figure 3:
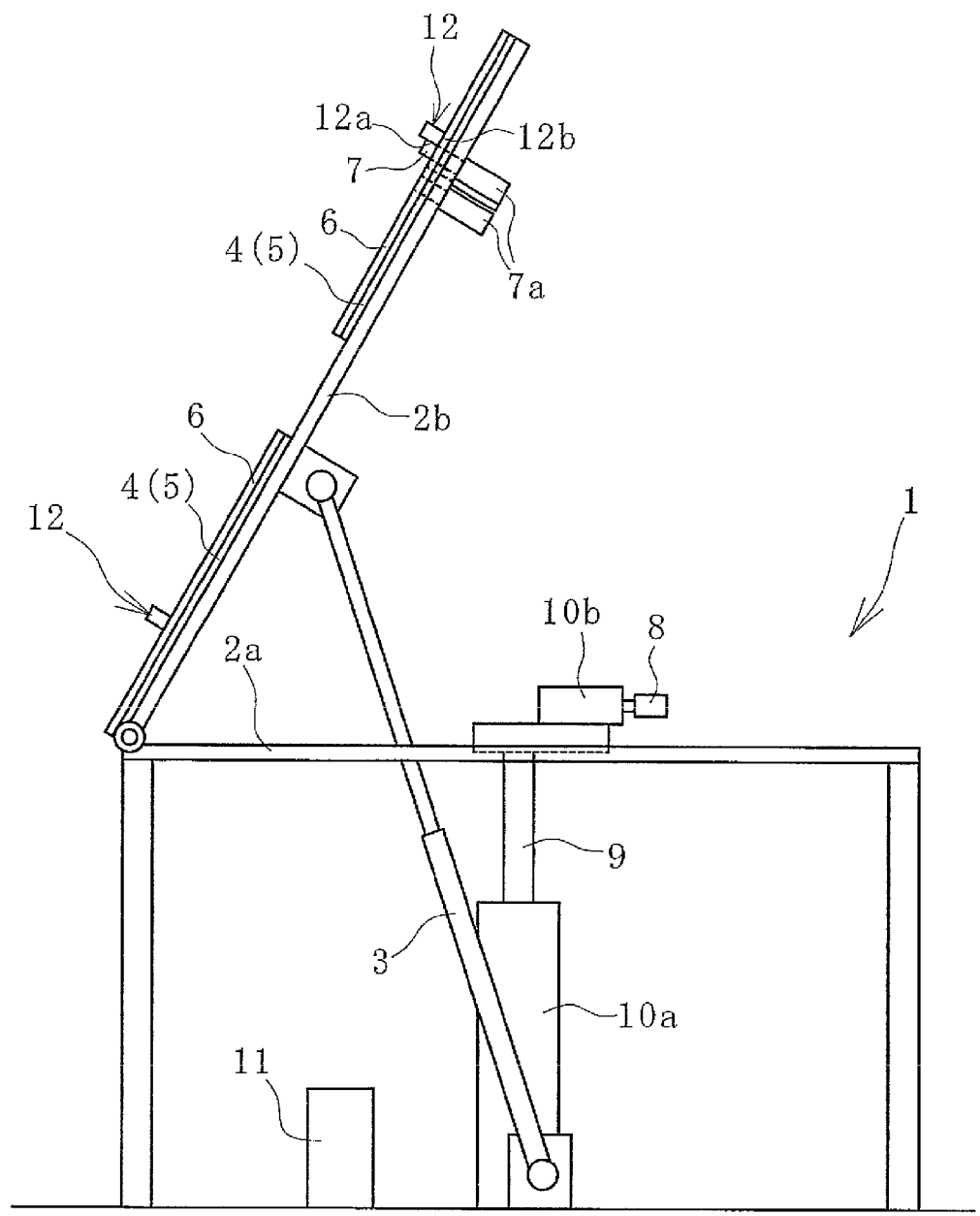
FIG. 3 is an explanatory diagram illustrating a support of the measuring device of FIG. 2 in an upright position in a side view.

The support 4 is attached to a frame 2. The frame 2 includes a base frame 2a and a movable frame 2b, and the movable frame 2b is connected to the base frame 2a at one end in a manner allowing for rotation. The movable frame 2b is able to be raised off the base frame 2a via a raising mechanism 3. For example, as illustrated in FIG. 3, the movable frame 2b is raised a predetermined angle range from a horizontal state to a vertical state, taking an upright state. Accordingly, the support 4 also can be raised from a horizontal state to an upright state. A hydraulic cylinder or the like can be used as the raising mechanism 3.

A plurality of projection portions 7 are provided on the surface of the support 4 spaced from one another, the projection portions 7 projecting from the surface. The projection portions 7 are moved via a retracting mechanism 7a allowing them to retract from the surface of the support 4. An air cylinder, a hydraulic cylinder, and the like can be used as the retracting mechanism 7a. Two projection portions 7 work as a set, and the space between and position of the projection portions 7 of a set in a plan view is set based on the inner diameter of the circular member 12 to be measured.

The two-dimensional sensor 8, in a plan view, is disposed in a central portion of the support 4 and disposed inward of the circular member 12 placed flat on the support 4. The two-dimensional sensor 8 is capable of movement in the radial direction of the circular member 12 via a horizontal movement mechanism 10b. This allows the two-dimensional sensor 8 disposed facing an inner circumferential surface 12a of the circular member 12 placed flat to be moved in the direction toward the inner circumferential surface 12a and away from the inner circumferential surface 12a.

The two-dimensional sensor 8 and the horizontal movement mechanism 10b, in a plan view, are disposed at a predetermined position on the support 4 (for example, the center of the support 4) and are supported by a rotation shaft 9 configured to extend and retract vertically. The rotation shaft 9 is driven in rotation by the rotation driving mechanism 10a about the axial center thereof. Accordingly, the two-dimensional sensor 8 is driven in rotation about the rotation shaft 9.

A laser sensor can be used as the two-dimensional sensor 8. The two-dimensional sensor 8 is configured to measure a separation distance d from the two-dimensional sensor 8 to the inner circumferential surface 12a in a non-contact state with the circular member 12 by reflecting a laser beam of the inner circumferential surface 12a and receiving the reflected laser beam. The two-dimensional sensor 8 is configured to measure the separation distance d from the two-dimensional sensor 8 and the inner circumferential surface 12a in the range irradiated by radiating a laser beam not at one point of the inner circumferential surface 12a but in a single instance radiating a lengthwise area.

The separation distance d measured by the two-dimensional sensor 8 is entered into the calculation unit 11. Additionally, a distance w from the position of the rotation shaft 9 (axial center) to the two-dimensional sensor 8 in a plan view is entered into the calculation unit 11.

The process of measuring an inner circumferential length L of the circular member 12 using the measuring device 1 will be described below.

To place the circular member 12 flat on the support 4, firstly, the support 4 is put in an upright state at a predetermined angle as illustrated in FIG. 3. Then, two of the projection portions 7 chosen based on the inner diameter of the circular member 12 are made to project from the surface of the support 4. The inclination angle of the support 4 in an upright state with respect to the horizontal ranges from 45° to 75°.

Next, the circular member 12 is placed on the support 4 with the inner circumferential surface 12a of the circular member 12 engaging with the two projection portions 7 projecting from the surface of the support 4. Accordingly, the circular member 12 is put in a state in which the inner circumferential surface 12a is supported by the two projection portions 7 and a lower surface 12b is supported by the protrusion-like support portions 6. A crane or the like can be used to place large-sized circular members 12.

Next, as illustrated in FIG. 2, the support 4 is lowered to a horizontal state by the raising mechanism 3. Thereafter, the projection portions 7 are retracted under the surface of the support 4. This puts the circular member 12 flat on the support 4 in an unrestrained state.

By placing the circular member 12 on the support 4 in an upright state in such a manner, large-sized and heavy circular member 12 can be placed on the support 4 in a relatively small space. The inner diameter of the circular member 12 measured as the inner circumferential length L is not particularly limited in the present technology, and, for example, the inner diameter in embodiments of the present technology can range from 500 mm to 2000 mm. By the inner circumferential surface of the circular member 12 engaging with the two projection portions 7 on the support 4 in an upright state, the circular member 12 can be positioned on the support 4.

Additionally, when the support 4 in an upright state is brought to a horizontal state, the circular member 12 is placed flat, positioned at a desired position with respect to the support 4. Accordingly, the positions of the projection portions 7 are set on the support 4 at positions in a plan view where the circular member 12 can be positioned at desired position when placed flat. For example, the positions of the projection portions 7 are set on the support 4 at positions in a plan view such that the position of the center of the circle of the circular member 12 when placed flat is in a range equal to or less than 20 mm out from the position of the rotation shaft 9. Additionally, a suitable space between the projection portions 7 is ensured, as when the space in a plan view between the two projection portions 7 that work as a set is too small, the support 4 in an upright state is unsuitable to stably hold the circular member 12.

With different circular members 12 of different inner diameters, the positions of the projection portions 7 can change so that the circular member 12 is positioned at a desired position when placed flat. For example, the two projection portions 7 are preferably set at suitable positions and a suitable space in a plan view to correspond to each size of the inner diameters of the circular members 12. In this embodiment, by the positions of and space between the two projection portions 7 in a plan view being suitably set, circular members 12 of different inner diameter sizes can be set with the center of their circle when placed flat substantially coinciding with the position of the rotation shaft 9. This allows various circular members 12 of various inner diameter sizes to be accurately position at a desired position on the support 4 and placed flat, granting high versatility.

Next, the two-dimensional sensor 8 that faces the inner circumferential surface 12a of the circular member 12 is moved as necessary by the horizontal movement mechanism 10b toward the inner circumferential surface 12a and is stopped at a predetermined measurement position. In other words, the two-dimensional sensor 8 is moved such that the inner circumferential surface 12a is in a range enabling measurement by the two-dimensional sensor 8. Accordingly, in a case where the inner circumferential surface 12a of the circular member 12 placed flat in an unrestrained state on the support 4 is in a range of the two-dimensional sensor 8 at its initial position enabling measurement, there is no need to move the two-dimensional sensor 8 via the horizontal movement mechanism 10b.

Figure 4:
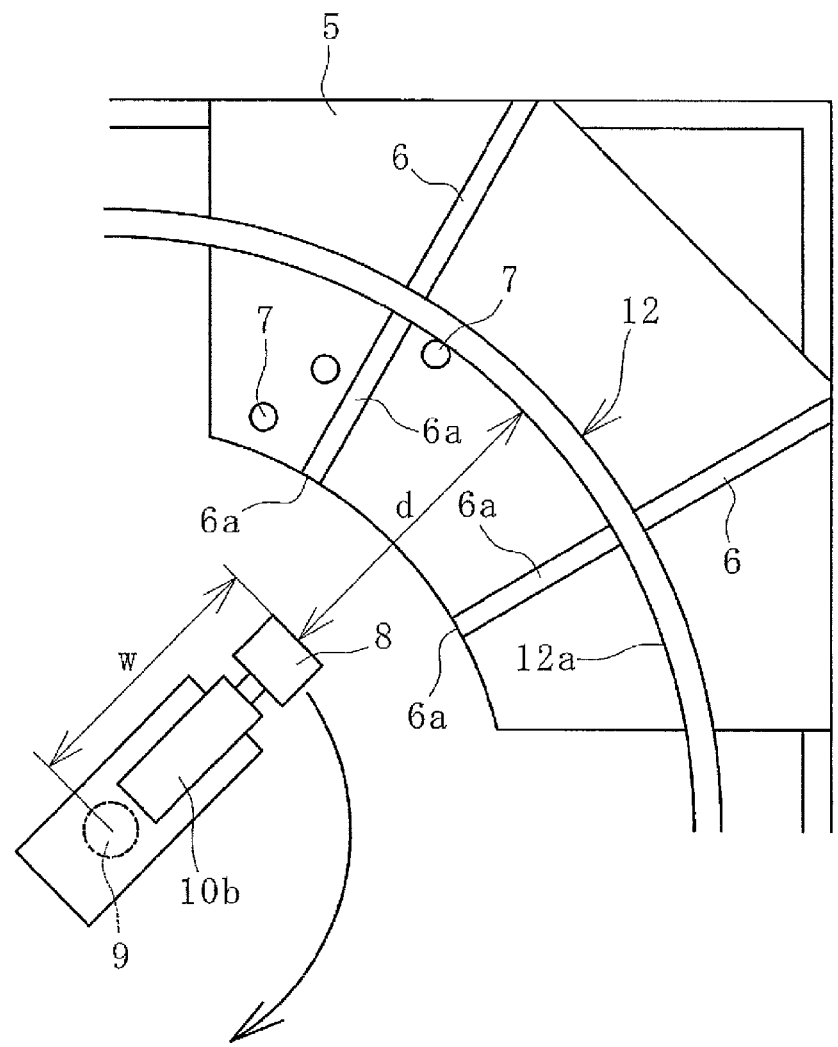
FIG. 4 is an explanatory diagram illustrating a process of a two-dimensional sensor measuring a separation distance to an inner circumferential surface of a circular member.
Figure 5:
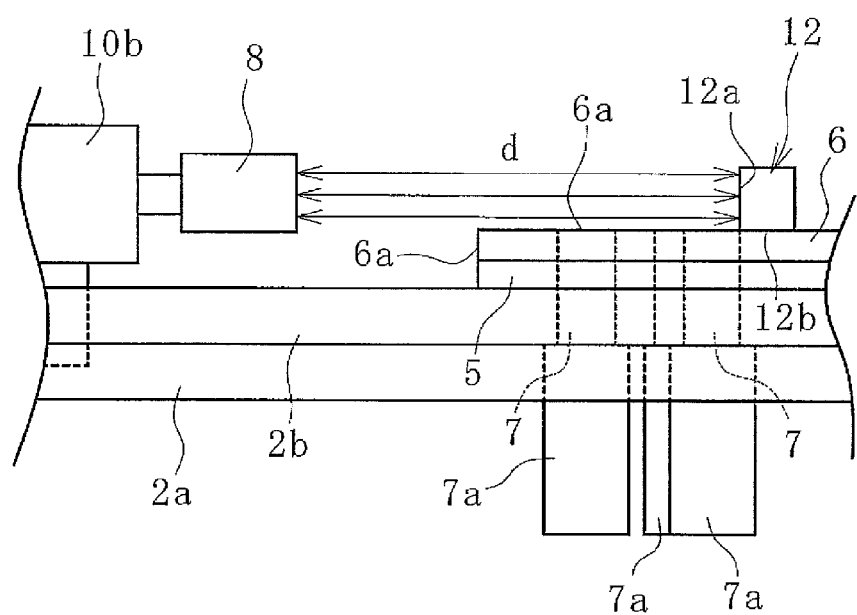
FIG. 5 is an explanatory diagram illustrating the process of FIG. 4 in a side view.

Next, as illustrated in FIGS. 4 and 5, the two-dimensional sensor 8 positioned at a predetermined measurement position is rotated about the rotation shaft 9, the separation distance d from the two-dimensional sensor 8 to the inner circumferential surface 12a is measured, and the separation distances d for the entire circumference of the circular member 12 is measured. The measured separation distances d are entered into the calculation unit 11. The distance w in a plan view from the rotation shaft 9 to the two-dimensional sensor 8 at a predetermined measurement position can be determined, and this distance w is also entered into the calculation unit 11. Accordingly, a distance (w+d) from the axial center of the rotation shaft 9 to the inner circumferential surface 12a in a plan view can be determined for the entire circumference of the circular member 12.

The angle the two-dimensional sensor 8 rotates about the rotation shaft 9 between measuring the separation distance d at one position to measuring the separation distance d at the next position is a minute angle A (rad). For example, the minute angle A is approximately 2π/15000 (rad).

Figure 6:
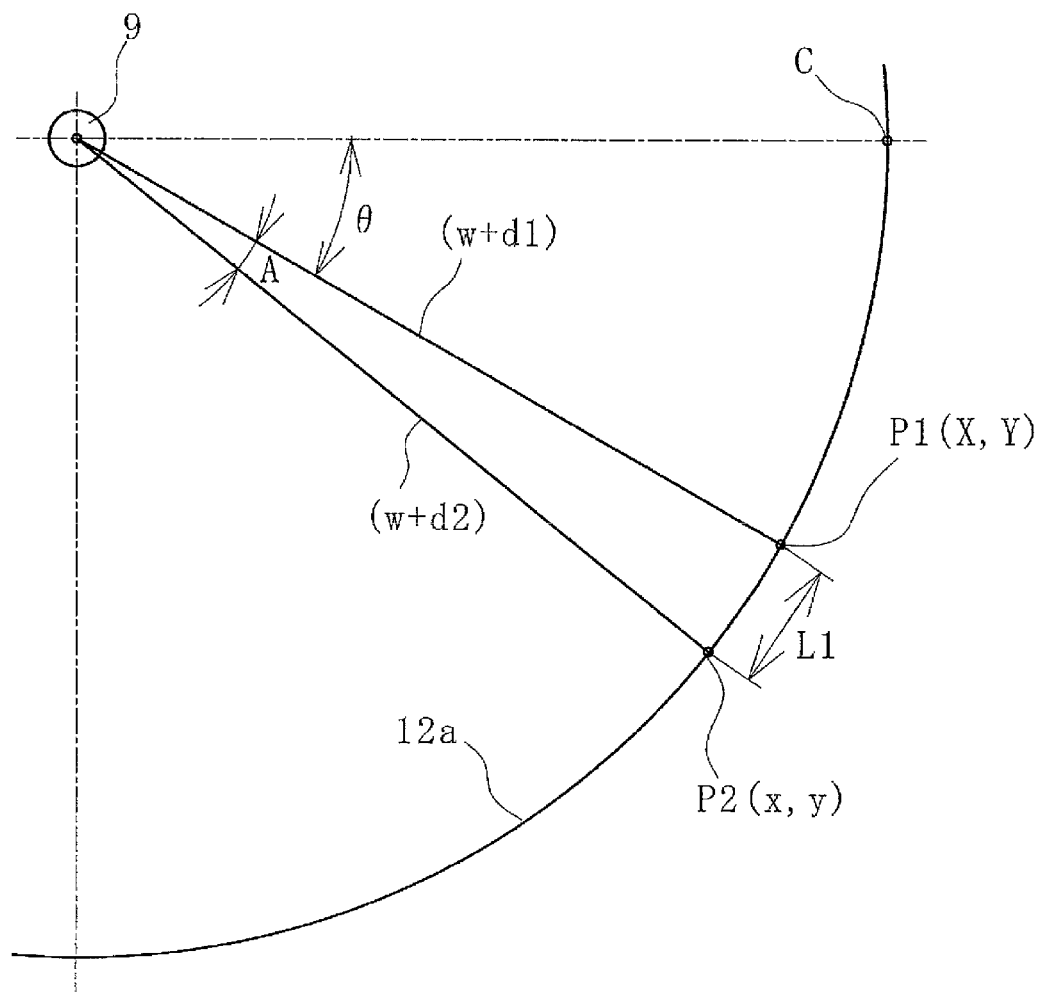
FIG. 6 is an explanatory diagram illustrating a method of calculating an inner circumferential length.

One example of the many possible methods of calculating the inner circumferential length L of the circular member 12 will be described below. As illustrated in FIG. 6, adopting the axial center of the rotation shaft 9 as the origin point, a discretionary position P1 (X, Y) on the inner circumferential surface 12a of the circular member 12 that is detected by the two-dimensional sensor 8 and a position P2 (x, y) that is the position P detected next are specified. The distance from the axial center of the rotation shaft 9 to the position P1 in a plan view is w+d1 and the distance from the axial center of the rotation shaft 9 to the position P2 is w+d2. The rotational angle from a reference point C to a position P1 is 0, and the coordinates for the position P1 (X, Y) are X=(w+d1)cos θ, and Y=(w+d1)sin θ. The coordinates for the position P2 (x, y) are x=(w+d2)cos θ (θ+A), and y=(w+d2)sin θ (θ+A). The coordinates of the reference point C, the rotational angle θ, the minute angle A, the distance (w+d1) and (w+d2) can be determined, thus the coordinates of the position P1 (X, Y) and the position P2 (x, y) can be found. A minute inner circumferential length L1 for the minute angle A can be approximated to L1={(X−x)$^2$+(Y−y)$^2$}/2. The calculation unit 11 calculates the inner circumferential length L by adding together the minute inner circumferential lengths L1 for the entire circumference of the circular member 12. Note that in FIG. 6, the angle is illustrated larger than the actual angle for the sake of describing the minute angle A.

The two-dimensional sensor 8 in one instance radiates laser beams in a predetermined lengthwise range in the vertical direction and measures the separation distance d from the two-dimensional sensor 8 and the inner circumferential surface 12a in the irradiated range. As the separation distance d obtained when calculating the inner circumferential length L, for example, the separation distance d at a discretionary position in the vertical direction, such as the separation distance d at a center position of the inner circumferential surface 12a in the vertical direction, and the separation distance d at a predetermined position in the vertical direction, can be used.

According to the embodiment described above, the inner circumferential length L of the circular member 12 placed flat in an unrestrained state on the support 4 is measured using the two-dimensional sensor 8 in a non-contact state with the circular member 12. Thus, an unnecessary load is not applied to the circular member 12, and thus deformation thought obligatory does not occur.

Furthermore, the circular member 12 can be easily placed on the support 4 with good accuracy by putting the support 4 in an upright state and making the inner circumferential surface 12a of the circular member 12 engage with the two projection portions 7. Thereafter, by lowering the support 4 to a horizontal state, the process of placing the circular member 12 flat in an unrestrained state can be completed. Compared to placing the circular member 12 directly on the support 4 in a horizontal state, this can reduce the amount of movement and make the operation of accurate positioning unnecessary. Even a large-sized circular member 12 can be easily and accurately placed flat on the support 4 at a predetermined position, and unnecessary external forces on the circular member 12 during placement are minimized or removed allowing deformation to be reduced. This is advantageous in measuring the inner circumferential length L of the circular member 12 with high accuracy.

The position of the center of the circle of the circular member 12 when placed flat on the support 4 with the arrangement of the projection portions 7 appropriately set is set in a range 20 mm or less from the position of the rotation shaft 9. Accordingly, the position of the center of the circle of the circular member 12 and the position of the rotation shaft 9 substantially matches. In this way, the difference between the actual value of the inner circumferential length L and the value calculated by approximation is further reduced, and the inner circumferential length L can be determined with higher accuracy.

In this embodiment, the surface of an adjacent portion of the support 4 adjacent to the circular member 12 placed flat on the support 4 in an unrestrained state includes a low reflection surface 6a configured to diffuse reflect the laser beam radiated from the two-dimensional sensor 8. Specifically, the upper surface and the inner circumferential end surface of the protrusion-like support portion 6 are low reflection surfaces 6a blast treated to form minute ridges/grooves in the surface. In this way, a laser beam that hits the upper surface or the inner circumferential end surface of the protrusion-like support portion 6 is diffuse reflected and is not received by the two-dimensional sensor 8. Thus, in a configuration in which the two-dimensional sensor 8 is configured to radiate a laser beam in an area rather than at a single point, measurement noise when measuring the separation distance d can be reduced.

The projection portions 7 are retracted below the surface of the support 4 when the two-dimensional sensor 8 measures the separation distance d. Thus, the projection portions 7 do not block the laser beam radiated from the two-dimensional sensor 8.

Additionally, the circular member 12 is supported by the protrusion-like support portions 6, making it easy to align the measurement center of the two-dimensional sensor 8 and the center of the inner circumferential surface 12a of the circular member 12 in the vertical direction. Furthermore, the inner circumferential surface 12a is suspended at the portions where the circular member 12 is not supported by the protrusion-like support portions 6. Thus, the adjacent portions of the support 4 adjacent to the inner circumferential surface 12a are kept to a minimum. This is advantageous in reducing measurement noise when measuring the separation distance d via the two-dimensional sensor 8.

The invention claimed is:

1. An inner circumferential length measuring device for a circular member, comprising:
    a support on which the circular member is placed;
    a two-dimensional sensor disposed allowing for movement relative to the support; and
    a calculation unit configured to receive measurement data from the two-dimensional sensor;
    the support being raisable from a horizontal state to an upright state;
    the support comprising a plurality of projection portions on a surface, the plurality of projection portions being spaced from one another and projecting from the surface;
    by an inner circumferential surface of the circular member being engaged with two of the plurality of projection portions of the support in an upright state, the circular member being able to be placed on the support;
    by the support on which the circular member is placed being put in a horizontal state, the circular member being able to be placed flat on the support in an unrestrained state;
    by the two-dimensional sensor disposed facing the inner circumferential surface of the circular member at a predetermined measurement position being rotated about a predetermined position inward of the circular member, a separation distance from the two-dimensional sensor to the inner circumferential surface being measured by the two-dimensional sensor in a non-contact state with the circular member in a range of an entire circumference of the circular member; and
    the calculation unit calculating an inner circumferential length of the circular member based on the separation distance measured and a distance from the predetermined position to the two-dimensional sensor in a plan view.

2. The inner circumferential length measuring device for a circular member according to claim 1, wherein
    the plurality of projection portions are retractable from the surface of the support.

3. The inner circumferential length measuring device for a circular member according to claim 2, wherein
    the support comprises an upward projecting protrusion support portion on an upper surface; and
    the circular member is placed flat in an unrestrained state on the protrusion support portion.

4. The inner circumferential length measuring device for a circular member according to claim 3, wherein
    the two-dimensional sensor is a laser sensor; and
    a surface of an adjacent portion of the support adjacent to the circular member placed flat on the support in an unrestrained state is configured to diffusely reflect laser light radiated by the laser sensor.

5. The inner circumferential length measuring device for a circular member according to claim 1, wherein
    the support comprises an upward projecting protrusion support portion on an upper surface; and
    the circular member is placed flat in an unrestrained state on the protrusion support portion.

6. The inner circumferential length measuring device for a circular member according to claim 1, wherein
    the two-dimensional sensor is a laser sensor; and
    a surface of an adjacent portion of the support adjacent to the circular member placed flat on the support in an unrestrained state is configured to diffusely reflect laser light radiated by the laser sensor.

* * * * *